United States Patent [19]

Almond et al.

[11] Patent Number: 4,505,721
[45] Date of Patent: Mar. 19, 1985

[54] ABRASIVE BODIES

[76] Inventors: Eric A. Almond, 34 Weston Ave., West Molesey, Surrey, KT8 9RG; Mark G. Gee, 20, Morland Close, Hampton, Teddington, Middlesex, both of England

[21] Appl. No.: 480,484

[22] Filed: Mar. 30, 1983

[30] Foreign Application Priority Data

Mar. 31, 1982 [GB] United Kingdom ............... 8209409
Jan. 31, 1983 [GB] United Kingdom ............... 8302620

[51] Int. Cl.$^3$ ............................................. B24D 3/02
[52] U.S. Cl. ................................. 51/309; 51/293
[58] Field of Search ................................ 51/293, 309

[56] References Cited

U.S. PATENT DOCUMENTS

| 3,141,746 | 7/1964 | DeLai | 51/309 |
| 3,745,623 | 7/1973 | Wentrof, Jr. | 29/95 |
| 4,156,329 | 5/1979 | Daniels et al. | 51/309 |
| 4,225,322 | 9/1980 | Knemeyer | 51/309 |

FOREIGN PATENT DOCUMENTS 1489130 10/1977 United Kingdom .

OTHER PUBLICATIONS

Newsom, M. and Huff, C. F., "Sandia Laboratories Drilling Technology Research Program, Albuquerque, New Mexico, pp. H-8/1-H-8/19.

Primary Examiner—Paul Lieberman
Assistant Examiner—Willie J. Thompson
Attorney, Agent, or Firm—Handal & Morofsky

[57] ABSTRACT

There is provided an abrasive body comprising a composite abrasive compact bonded to a metal containing substrate, typically made of cemented carbide, through a bonding layer comprising nickel, copper, cobalt, iron or an alloy containing one or more of these metals. The abrasive body has particular application as a cutting element for a drill crown.

The abrasive body is made by bonding the composite abrasive compact to the substrate using solid state diffusion bonding techniques.

17 Claims, 3 Drawing Figures

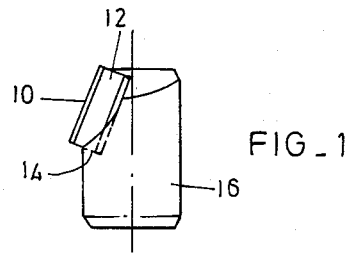
FIG_1
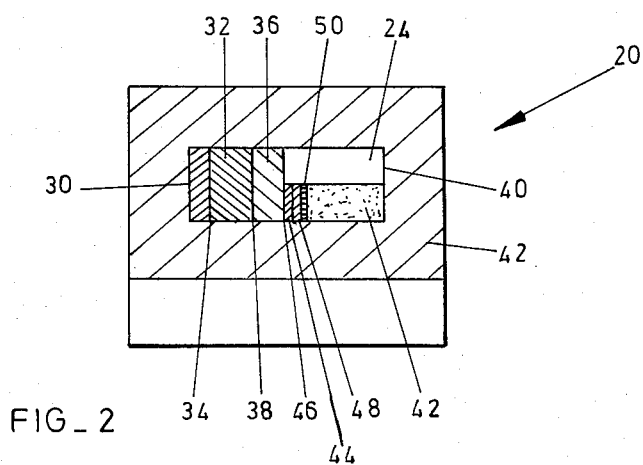
FIG_2
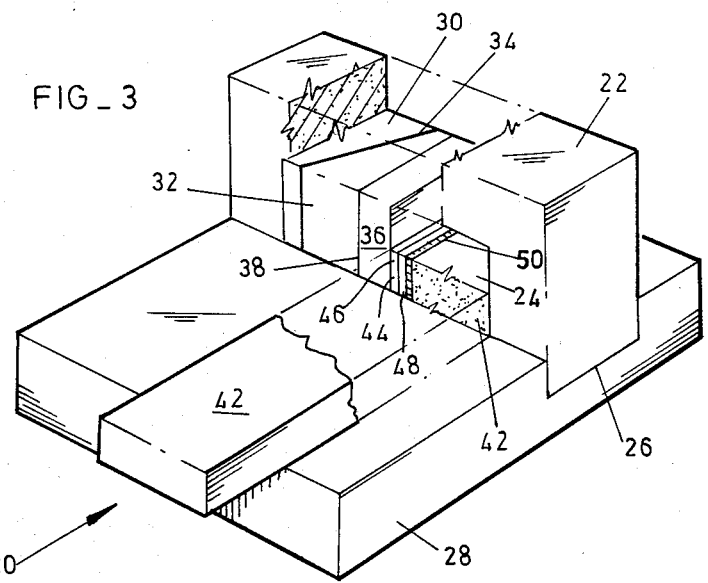
FIG_3

ABRASIVE BODIES

BACKGROUND OF THE INVENTION

This invention relates to abrasive bodies.

One type of insert or cutting element for drill crowns currently available on the market consists of a diamond compact bonded to a support backing of metal bonded (cemented) carbide which in turn is bonded to a larger substrate of metal bonded carbide by means of a brazing filler metal. The brazing filler metal has a melting point about 700° C. to ensure that a good bond is achieved and maintained between the substrate and backing during the severe conditions which will prevail during use of the drill crown. Care must be exercised during the manufacture of the inserts to ensure that degradation of the diamond compact layer does not occur during brazing of the backing to the substrate. This may be achieved by placing the diamond compact in contact with a heat sink during the brazing.

SUMMARY OF THE INVENTION

According to the present invention, there is provided an abrasive body comprising:
(a) an abrasive compact;
(b) a backing of cemented carbide bonded to the abrasive compact; and
(c) a metal-containing substrate bonded to the backing through a bonding layer comprising nickel, copper, cobalt, iron or an alloy containing one or more of these metals.

According to another aspect of the invention, there is provided a method of making the above-described abrasive body including the steps of interposing a layer of nickel, copper, cobalt, iron or alloy containing one or more of these metals between a surface of the substrate and a surface of a cemented carbide backing to which the compact is bonded, and diffusion bonding the backing to the substrate through the interposed layer at a temperature below the melting point of the layer.

DESCRIPTION OF THE DRAWINGS

FIG. 1 illustrates a side view of an embodiment of an abrasive body of the invention;

FIG. 2 illustrates a sectional side view of an assembly for use in the method of the invention; and FIG. 3 illustrates a partially sectioned perspective view of the assembly of FIG. 2.

DETAILED DESCRIPTION OF THE INVENTION

Abrasive compacts are well known in the art and consist of a polycrystalline mass of superhard abrasive particles bonded into a hard conglomerate. Such compacts will generally have a second or bonding phase which invariably contains a catalyst or solvent for the particular superhard abrasive particle of the compact. The superhard abrasives currently known and used in compacts are diamond and cubic boron nitride.

The cemented carbide backing may be any known in the art such as cemented titanium carbide, cemented tantalum carbide, cemented tungsten carbide or mixtures thereof. The metal phase for such cemented carbides is generally nickel, cobalt or iron which is present in an amount of 3 to 35 percent by weight.

The abrasive compact may be bonded directly to the carbide backing or it may be bonded to the carbide backing through a bonding layer.

Abrasive compacts which are bonded to a cemented carbide backing are also known as "composite abrasive compacts". Examples of abrasive compacts and composite abrasive compacts can be found in British Patent Specification No. 1,489,130, and U.S. Pat. Nos. 3,745,623 and 3,743,489 the disclosures of which are incorporated herein by reference.

The substrate will generally be larger in mass and volume than the combined mass and volume of the abrasive compact and carbide backing. The substrate will generally be a cemented carbide, but it can also be a steel such as a hardened steel.

The bonding layer between the backing and the substrate will generally have a thickness of up of 220 microns. It has been found that the shear strength of the bond between the backing and the substrate can be high, i.e. 140N/mm$^2$ or higher.

The abrasive body of the invention has application as a component for an abrasive tool. In particular, the abrasive body has application as an insert, i.e. cutting element, for a drill bit or crown. An example of such a cutting element is illustrated by FIG. 1 of the accompanying drawings. Referring to this Figure, there is shown a cutting element comprising a disc-shaped abrasive compact 10 bonded to a cemented carbide backing 12. The carbide backing 12 is located in a recess 14 in an elongate substrate 16. Bonding of the carbide backing 12 to the substrate 16 is achieved through a bonding layer 18 of the type described above.

The abrasive bodies of the invention will generally be made by first manufacturing a composite abrasive compact consisting of the abrasive compact bonded to the cemented carbide backing by methods known in the art such as those described in British Pat. No. 1,489,130 and U.S. Pat. Nos. 3,745,623 and 3,743,489. Thereafter, the composite abrasive compact will be bonded to the substrate through a bonding layer as defined above using diffusion bonding techniques. Diffusion bonding is known in the art and is a process which produces a metal-to-metal bond in which atoms of the metal migrate across the joint interface and form continuous grain. The process is a solid state process with the metal not reaching its melting point. Diffusion bonding has been found to produce bonds of excellent strength between the backing and substrate under conditions where damage to the abrasive particle of the abrasive compact is substantially avoided. In other words, the compact is substantially free of graphite in the case of diamond compacts and substantially free of hexagonal boron nitride in the case of cubic boron nitride compacts.

Preferably, the method includes the following steps:
(a) providing a composite abrasive compact comprising an abrasive compact bonded to a cemented carbide backing;
(b) bonding a layer of nickel, copper, cobalt, iron or an alloy containing one or more of these metals to a surface of a metal-containing substrate;
(c) bringing the backing and substrate together so that the metal layer contacts a surface of the cemented carbide backing;
(d) urging the backing and substrate together by applying a transverse pressure thereto;
(e) raising the temperature of the metal layer to a suitable temperature below its melting point; and (f) maintaining the pressure and temperature for a time sufficient to cause diffusion bonding between the backing and the substrate, steps (e) and (f) being carried out in an inert atmosphere.

During diffusion bonding of the backing to the substrate the pressure applied will generally be 40 to 300N/mm$^2$ and the temperature applied will be typically of the order of 650° to 750° C. The diffusion bonding will take place in a vacuum 10$^{-4}$ Torr or better or other inert atmosphere such as an inert gas to minimise damage to the abrasive particles of the abrasive compact taking place. The pressure and temperature may be maintained for a period of 5 to 300, typically 5 to 35, minutes to ensure that a good bond is achieved.

The transverse pressure may be applied in the method of the invention by methods known in the art, for example, using a hydraulic cylinder press.

One particular method of applying the desired transverse pressure to the backing and substrate utilises the difference in coefficient of thermal expansion between an outer surround body and an inner expansion body. The method involves placing the substrate and backing, after they have been brought together in step (c), in the cavity of an assembly comprising a surround body having a cavity formed therein and an expansion body located in the cavity and having a coefficient of thermal expansion greater than the surround body, and raising the temperature of the assembly to the desired temperature of step (e) thereby causing the expansion body to expand and apply the desired transverse pressure of step (d) to the backing and the substrate.

Typically the temperature of the assembly is raised by placing it in a furnace.

The surround body may be made of cemented carbide or a ceramic based on silicon nitride or zirconia.

The expansion body is typically made of a metal or alloy which has a high coefficient of thermal expansion. An example of a suitable alloy is the nickel-based alloy Nimonic.

The surface of the cavity in contact with the expansion body may be sloping and match a sloping surface of the body. Alternatively, the expansion body may be in two contacting parts, the contacting surfaces being sloping and matching.

If the expansion body reacts detrimentally with the components being bonded under the applied temperature conditions, a suitable inert filler material may be provided between the expansion body and the components being bonded.

This method of applying pressure has particular application to the bonding of composite abrasive compacts to tool shanks, i.e. the tool shank is the substrate.

The attached FIGS. 2 and 3 illustrate an embodiment of this aspect of the invention.

Referring to these Figures, there is shown an assembly 20 comprising a surround body 22 made of cemented carbide and having a slot or cavity 24 formed therein. The surround body 22 is mounted in recess 26 in a steel supporting base 28.

Located in the cavity 24 are opposing wedges 30, 32 which have contacting sloping surfaces along line 34. These wedges are made of the alloy Nimonic.

Also located in the cavity is a packing element 36 in contact with the surface 38 of wedge 32. Located between the packing element 36 and the surface 40 of surround body is a tool shank 42 in bonding relationship with a composite abrasive compact 44 comprising an abrasive compact 46 bonded to a cemented carbide backing 48. Located between the tool shank 42 and the backing 48 is a thin metal layer 50 suitable for creating a diffusion bond between the tool shank and the backing.

In order to achieve effective diffusion bonding between the tool shank and the backing the entire assembly is placed in a furnace at a suitable temperature. The temperature must be such as to allow diffusion bonding to take place. At this temperature the Nimonic wedges 30, 32 expand at a faster rate than the surround body 22. This has the effect of exerting a bonding pressure on the tool shank 42 and backing 48.

Polishing of the exposed surface of the metal layer is important and preferred to ensure that the surface is as flat as possible. Polishing may be achieved by use of a diamond polishing tool. The surface of the backing to which the substrate is bonded should also be as flat as possible.

The metal layer bonded to the surface of the substrate does tend to buckle and distort, particularly during polishing. To minimise this, it has been found preferable to deposit the layer on the surface, apply a transverse pressure to the layer, raise the temperature of the layer to a temperature below the melting point and maintain the pressure and temperature for a period sufficient to enable the layer to bond to the substrate. Typically, the pressure applied to the layer is in the range 1 to 200N/mm$^2$ and the temperature to which the metal layer is raised is 700° C. to 1100° C. These conditions of temperature and pressure may be maintained for a period of 5 to 300 minutes, typically 5 to 30 minutes. The metal may be deposited on the surface of the substrate by methods known in the art such as electroplating, electroless plating, vapour deposition or sputtering or placing a foil of the metal in contact with the substrate or placing the foil in contact with a metal coated surface of the substrate. The transverse pressure may be applied to the layer by methods known in the art.

Prior to contacting the carbide backing with the metal coated surface of the substrate, the surface of the backing to be bonded may be provided with a thin metal coat of the same or similar metal to that which is used for coating a surface of the substrate. Such layer may be deposited on the surface of the backing by methods known in the art such as electroplating, electroless plating, vacuum deposition and sputtering.

The invention is further illustrated by the following examples.

EXAMPLE 1

A stub of cobalt-bonded tungsten carbide had a disc of annealed nickel deposited on a surface thereof. A pressure of 100N/mm$^2$ was applied to the nickel coated surface and the temperature raised to 830° C. These conditions were maintained for a period of 20 minutes. Thereafter, the exposed surface of the nickel layer was polished with a diamond polishing tool. The thickness of the nickel coat was 120 microns.

A disc-shaped composite abrasive compact consisting of a diamond compact bonded to a cobalt-bonded tungsten carbide backing was manufactured by the method described in British Pat. No. 1,489,130. This composite abrasive compact was then bonded to the stub by first contacting the rear surface of the backing with the nickel layer on the stub. A transverse pressure of 290N/mm$^2$ was applied to the composite abrasive compact and the stub to urge the two together and the temperature of the interface, i.e. nickel layer, raised to 725° C. This treatment was carried out in a vacuum of $10^{-4}$ Torr. These conditions were maintained for a period of 30 minutes.

An excellent bond was achieved between the carbide backing and the carbide stub by this diffusion bonding technique. The shear strength of the bond was measured and it was found to be of the order of 390N/mm². The thickness of the bonding layer between the backing and the stub was of the order of 120 microns.

EXAMPLE 2

The procedure set out in Example 1 was followed save that in bonding the nickel coated stub to the composite abrasive compact the following conditions were used:

Pressure applied—270N/mm²
Temperature applied—730° C.
Conditions maintained—300 minutes
Nickel coating—200 microns The shear strength of the bond between the carbide backing and the stub was found to be greater than 400N/mm².

We claim:

1. A method of making an abrasive body comprising an abrasive compact, a backing of cemented carbide bonded to the abrasive compact, and a metal-containing substrate bonded to the backing through a bonding layer comprising nickel, copper, cobalt, iron or an alloy containing one or more of these metals, including the steps of:
   (a) providing a composite abrasive compact comprising an abrasive compact bonded to a cemented carbide backing:
   (b) depositing a layer of nickel, copper, cobalt, iron or an alloy containing one or more of these metals on a surface of a metal-containing substrate, applying a transverse pressure to the layer, raising the temperature of the layer to a temperature below its melting point and maintaining the pressure and temperature for a period sufficient to enable the layer to bond to the substrate;
   (c) polishing the exposed surface of the metal layer;
   (d) bringing the backing and substrate together so that the polished surface of the metal layer contacts a surface of the backing;
   (e) urging the backing and substrate together by applying a transverse pressure thereto;
   (f) raising the temperature of the metal layer to a temperature below its melting point and in the range 650° to 750° C.; and
   (g) maintaining the pressure and temperature for a time sufficient to cause diffusion bonding between the backing and the substrate
steps (f) and (g) being carried out in an inert atmosphere.

2. The method of claim 1 wherein the shear strength of the bond between the backing and the substrate is at least 140N/mm².

3. The method of claim 1 wherein the substrate is made of cemented carbide.

4. The method of claim 1 wherein the abrasive compact is a diamond compact.

5. The method of claim 1 for use as a cutting element for a drill crown.

6. A method of claim 1 wherein the transverse pressure applied to the backing and substrate is in the range 40 to 300N/mm².

7. A method of claim 1 wherein the pressure and temperature are maintained for a period of 5 to 300 minutes.

8. A method of claim 7 wherein the pressure and temperature are maintained for a period of 5 to 35 minutes.

9. A method of claim 1 wherein the transverse pressure applied to the backing and substrate is in the range 40 to 300N/mm²; the temperature to which the metal layer is raised is in the range 650° to 750° C. and the temperature and pressure are maintained for a period of 5 to 300 minutes.

10. A method according to claim 1 wherein the substrate and backing after having been brought together in step (c) are placed in the cavity of an assembly comprising a surround body having a cavity formed therein and an expansion body located in the cavity and having a coefficient of thermal expansion greater than that of the surround body, and the temperature of the assembly raised to the desired temperature of step (e) thereby causing the expansion body to expand and apply the desired transverse pressure of step (d) to the backing and substrate.

11. A method according to claim 10 wherein the temperature of the assembly is raised by placing it in a furnace.

12. A method according to claim 10 wherein the surround body is made of cemented carbide or a ceramic based on silicon nitride or zirconia.

13. A method according to claim 10 wherein the expansion body is made of Nimonic.

14. A method of claim 1 wherein the pressure applied to the metal layer is 20 in the range 1 to 200N/mm².

15. A method of claim 1 wherein the pressure and temperature applied to the metal layer are maintained for a period of 5 to 300 minutes.

16. A method of claim 1 wherein the pressure and temperature applied to the metal layer are maintained for a period of 5 to 30 minutes.

17. A method of claim 1 wherein the pressure applied to the metal layer is in the range 1 to 200N/mm²; and the temperature and pressure applied to the metal layer are maintained for a period of 5 to 300 minutes.

* * * * *